US004001598B2

United States Statutory Invention Registration [19]

[11] Reg. Number: H1598

[45] Published: Oct. 1, 1996

O'Reilly et al.

[54] LIQUID PROPELLANT IGNITER

[75] Inventors: John J. O'Reilly, Montague; Nora M. DeVries, Morristown, both of N.J.; Robert L. Talley, East Aurora, N.Y.

[73] Assignee: The United States of America as represented by the Secretary of the Army, Washington, D.C.

[21] Appl. No.: 613,794

[22] Filed: Mar. 1, 1996

[51] Int. Cl.[6] ..... F42C 19/12

[52] U.S. Cl. ..... 102/202.8; 102/202.9; 102/440

*Primary Examiner*—Harold J. Tudor

*Attorney, Agent, or Firm*—Anthony T. Lane; Edward Goldberg; Michael Sachs

[57] ABSTRACT

A liquid propellant igniter uses axially aligned ring electrodes separated by high strength ring-shaped insulators and a high-voltage electrode assembly to provide reliable electrical discharges for initiating and igniting a propellant.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID PROPELLANT IGNITER

Governmental Interest

The invention described herein may be manufactured, used and licensed by or for the U.S. Government.

BACKGROUND OF THE INVENTION

A need has existed for a long period of time for a more reliable electrical igniter for liquid propellants. In the past, liquid propellant igniter systems included the use of electrically driven hot wire, exploding wire and spark and arc electrical discharges for the relatively low energy systems. The high energy and high power prior are igniters used electrically initiated plasma torch and plasma cartridge devices.

Prior art electrical igniter devices for liquid propellants frequently used a small diameter central pin type electrode surrounded by a larger diameter tube as the second electrode. In most cases the central electrode is shorter in length than the outer cylindrical electrode. The inside region of the outer cylinder is typically filled with a liquid propellant, surrounding and covering the central electrode. The output end of the outer tube of the igniter is usually of a somewhat reduced diameter to provide a small to moderate restriction of the liquid propellant and hot combustion gases flowing out of the igniter housing. Ignition occurs when a spark or arc discharge flows through the liquid propellant for sufficient time to initiate a self-sustained burn of the liquid propellant. It is during this initiation period that the restriction in output flow from the igniter causes the pressure within the igniter to increase and improve the ability to cause self-sustaining and reproducible ignition.

One of the problems with the aforedescribed prior art devices has been achieving high pressure seals between the electrode elements and the supporting high strength metal and insulator structure igniters.

Another problem of the prior art is maintaining the durability of the electrodes. After repeated ignitions the electrodes are eroded by the arc discharge and by the high temperature gases generated by the liquid propellant combustion. Changes in electrode shape and spacings frequently reduced the reliability of ignition of the prior art devices.

SUMMARY OF THE INVENTION

The present invention relates to the use of ring electrodes to achieve reliable electrical discharges for initiating and controlling the ignition process in liquid propellants.

An object of the present invention is the use of insulators of substantial size and strength for liquid and gas seals for both electrical and nonelectrical components within the igniter.

Another object of the present invention is to permit the use of electrode gaps of sufficient size that prevent electrical breakdown at very low voltages.

Another object of the present invention is the use of ring electrodes which can be shaped to enhance electrical spark or arc breakdown, as well as electrical heating of a liquid propellant during the early initiation portion of the ignition cycle.

Another object of the present invention is to provide ring electrodes for a liquid propellant igniter which is more durable because of their increased size when compared to prior art pin electrodes.

Another object of the present invention is to provide ring electrodes which exhibit less electrode wear, burning and erosion because of large surface areas for discharge, and therefore need not be replaced as frequently.

Another object of the present invention is to provide ring electrodes for a liquid propellant igniter having greater redundancy in maintaining a pristine surface condition without contaminating after many discharge cycles.

Another object of the present invention is to provide ring electrodes for a liquid propellant igniter having better heat dissipating characteristics than pin electrodes because of the greater surface area available for heat transfer.

A further object of the present invention is to provide ring electrodes for a conductive-type liquid propellant igniter which is less sensitive to electrode orientation than coaxial-electrode-type igniters.

For a better understanding of the present invention, together with other and further objects thereof, reference is made to the following description take in connection with the accompanying drawings.

BRIEF DESCRIPTION OF THE DRAWINGS

Throughout the following description like numerals are used to denote like parts of the drawings.

DETAILED DESCRIPTION OF THE PREFERRED EMBODIMENTS

Figure 1:
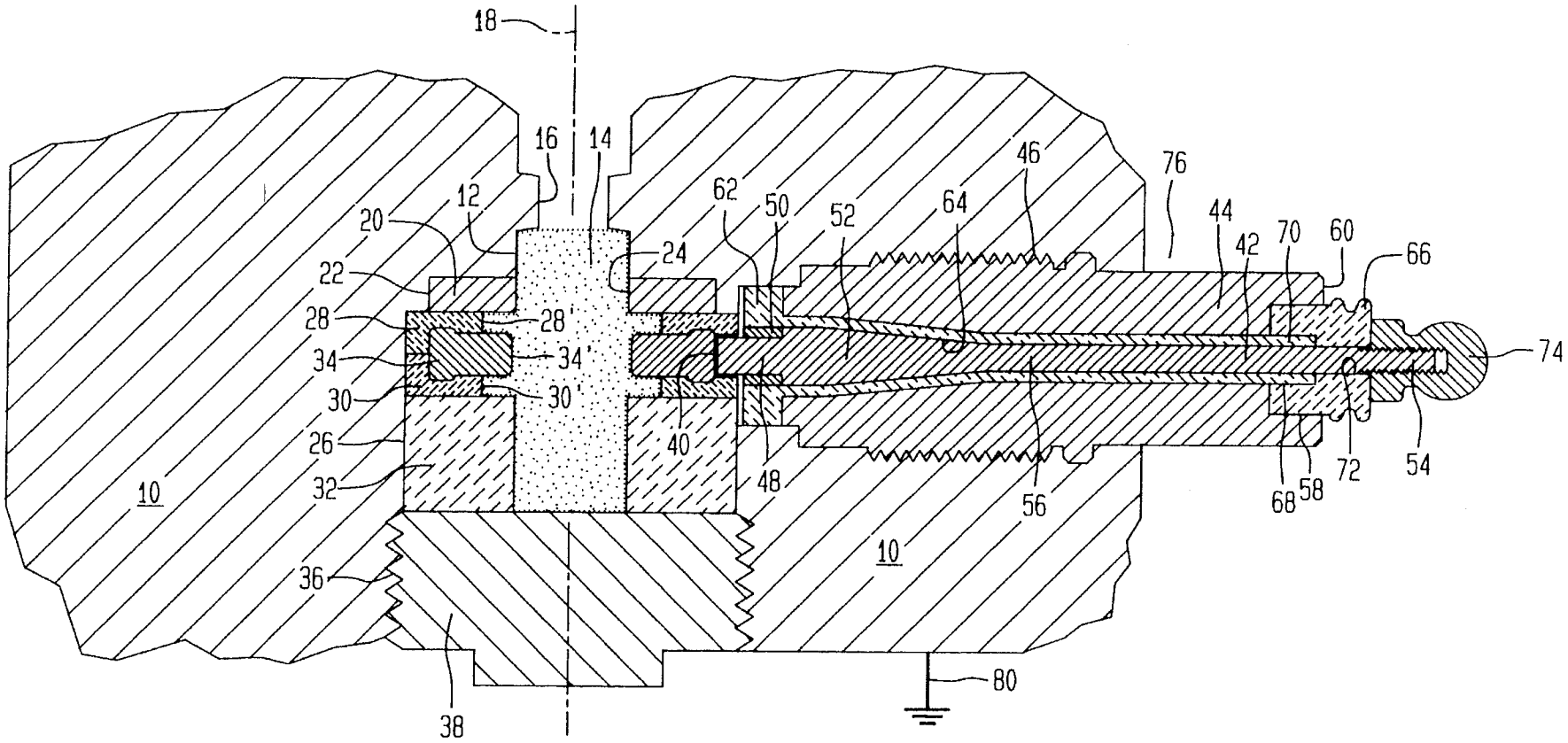
FIG. 1 is a diametral partial cross-sectional view of a two-electrode liquid propellant igniter.

Referring now to FIG. 1 an igniter steel housing 10 has a vertical propellant bore 12 for holding therein a liquid propellant 14. Propellant bore 12 has a restricted throat bore 16 in axial alignment with bore 12 along vertical centerline 18. A first ring electrode 20 is operatively disposed in an axially aligned first counter bore 22 having an inside diameter 24 which is equal to propellant bore 12 diameter. First ring electrode 20 makes good electrical contact and connection with igniter housing 10 on its upper and side surfaces. A slightly larger, axially aligned second housing counter bore 26 operatively holds high strength upper and lower ring-shaped insulators 28 and 30 respectively therein and a dielectric annular spacer 32. Annular spacer 32 has the same inside diameter as the propellant bore 12. The inside diameters 28' and 30' of upper and lower insulators respectively are larger than the propellant bore diameter 12. Operatively disposed in between the upper and lower ring-shaped insulator 28 and 30 respectively is the second ring electrode 34 having an inside diameter 34' which is equal in size to inside diameters of the propellant bore 12, the first ring electrode 20 and the dielectric spacer 32. A threaded counter bore 36 operatively holds a threaded metal housing steel plug 38 therein. Plug 38 seals the propellant bore 12 on its bottom end and holds the ring electrodes 20 and 34 in a fixed spatial relationship within housing 10. Electrical connection to ring electrode 34 is made through a wave spring contactor 40 which is positioned intermediate electrode 34 and a high voltage feed through electrode 42. High voltage feed through electrode 42 is fixedly held in housing 10 by an externally threaded steel tubular member 44 which is screwed into a threaded horizontal housing counter bore 46. The bottom end 48 of the tapered feed through electrode 42 is supported by a small annular high strength insulator 50. The middle section 52 of the feed through electrode 42 is tapered and is connected to a threaded top end 54 by cylindrical section 56. Tubular member 44 has an axially aligned counter bore 58 located in the top end 60 of threaded tubular member 44. A hollow flanged high strength feed through insulator 62 has a through bore 64 configuration which permits the annular insulator 50 and the tapered feed through electrode 42 to fit slidably therein. A high strength top end electrode insulator 66 slidably fits into top end counter bore 58 and has an axial counter bore 68 therein which slidably supports the top end 70 of the flanged feed through insulator 62. An axial insulator through hole 72 permits electrode top end 54 to slidably pass therethrough. A cap nut electrode connector terminal 74 threadedly holds the tubular member assembly 76 together.

Figure 2:
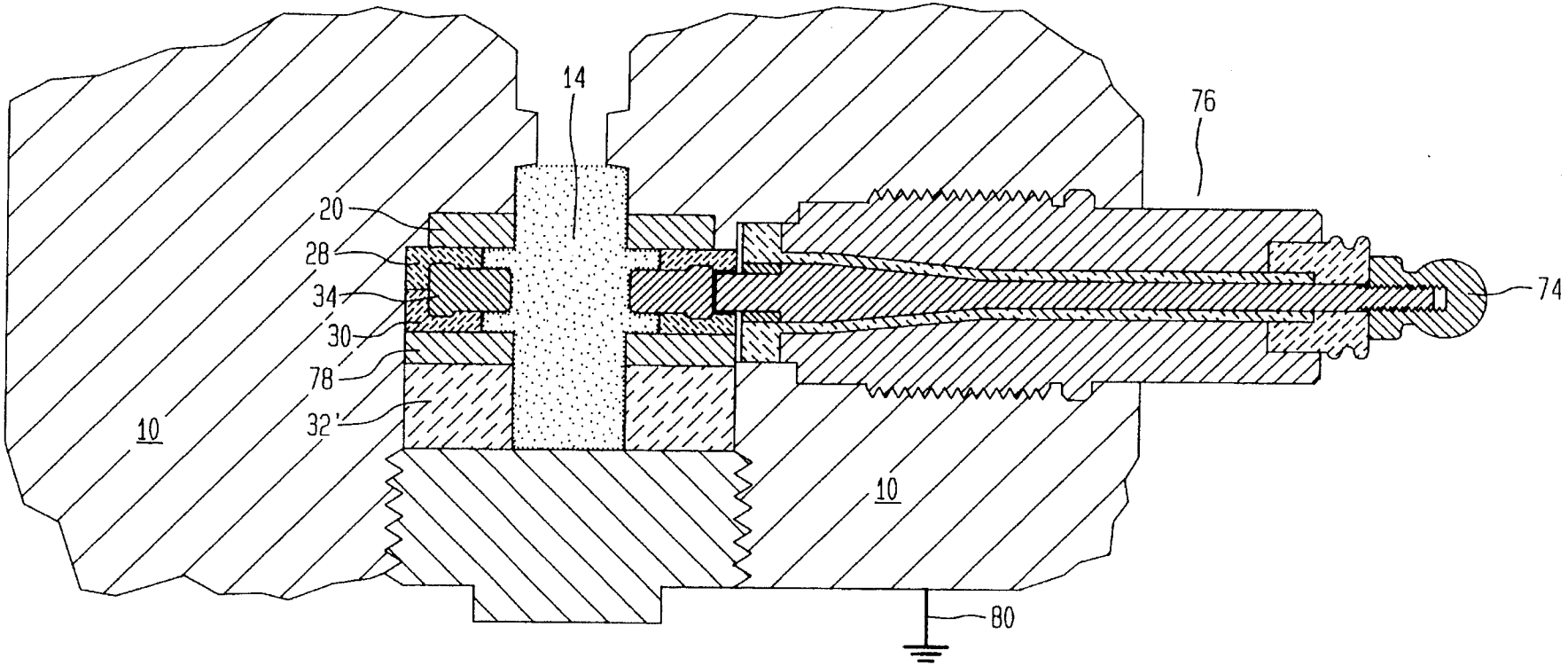
FIG. 2 is a diametral partial cross-sectional view of a three-electrode liquid propellant igniters which is a modification of FIG. 1.

Referring now to an alternate embodiment of the invention shown in FIG. 2, a third-ring electrode 78 is positioned intermediate modified spacer 32' and lower-ring insulator 30. Third-ring electrode 78 is electrically connected to the first-ring electrode 20 through conductive housing 10. All other structural elements of the alternate embodiment shown in FIG. 2 are identical to FIG. 1.

In operation, after the igniter assembled as aforedescribed the housing 10 is connected to ground potential by connector 80. A high voltage potential is then applied to cap terminal 74 which causes arc discharges to occur between first-ring electrode 20 and second-ring electrode 34 of FIG. 1. In the alternate embodiment of FIG. 2 since the first and third-ring electrodes 20 and 78 respectively are at the same ground potential, the arc discharges will occur intermittently between the second ring electrode 34 and the first and third electrodes. The arc or spark discharge will ignite the propellant 14 and in the immediate area of the ring electrodes producing high temperature gases which then continue igniting the propellant in a self-sustaining mode throughout the main propellant central bore. The central holes of ring electrodes 20, 78 and 34 permit the hot gases to readily pass therethrough and help sustain the cumulative rapid ignition of the liquid propellant.

Some liquid propellant types may be either electrically conducting or non-ducting. They also may be classified as monopropellants or biopropellants. Monopropellants have fuel, oxidizer and perhaps diluent mixed or blended to form a non-separating, chemically uniform propellant material at the molecular level. In the biopropellants the aforementioned elements form a propellant material which typically consists of an immerseable blend of fine droplets dispersed in a liquid carrier. Because of these propellant type differences, ring electrode numbers, sizes, spacings, and shapes may be tailored to obtain optimal ignition performance with each liquid propellant type.

While a specific embodiment of the invention has been shown and described in detail to illustrate the application of the principles of the invention, it will be understood that the invention may be embodied otherwise without departing from such principles.

What is claimed is:

1. A liquid propellant igniter which comprises:

a liquid propellant;

metal housing means for retaining said liquid propellant therein;

a plurality of ring electrode means operatively disposed in said housing means for providing an electrical arcing gap area;

electrode insulator means for holding said ring electrode means in axial alignment and insulated from each other;

propellant bore means for positioning said liquid propellant in axial disposition with said electrode and insulator means;

high voltage electrode assembly means for providing electrical connection to said ring electrode means; and plug means for retaining said liquid propellant in proximity of said electrode means and for supporting said electrode means and said insulator means in sufficiently close position to cause reliable ignition of said liquid propellant upon application of a high voltage to said electrode assembly means.

2. A liquid propellant igniter as recited in claim 1 wherein said housing means includes:

a vertical propellant bore in axial alignment with a vertical centerline;

a restricted throat bore in axial alignment with said propellant bore;

a first electrode counter bore in axial alignment with said propellant bore;

a second housing counter bore in axial alignment with said propellant ore;

a threaded counter bore in axial alignment with said propellant bore, and a horizontally threaded housing counter bore for operatively holding said electrode assembly means therein.

3. A liquid propellant igniter as recited in claim 2 wherein said ring electrode means includes:

a first-ring electrode positioned in said first-electrode counter bore of said housing means; and a second-ring electrode positioned operatively disposed in said second-electrode counter bore of said housing means.

4. A liquid propellant igniter as recited in claim 3 wherein said ring electrode means further includes a third-ring electrode electrically connected to the same potential as said first-ring electrode and in axial alignment therewith and separated therefrom by said electrode insulator means.

5. A liquid propellant igniter as recited in claim 4 wherein said electrode insulator means includes:

an upper ring-shaped insulator positioned intermediate said first-ring electrode and said second-ring electrode;

a lower ring-shaped insulator positioned in juxtaposition with said upper ring-shaped insulator and in contact with said second-ring electrode; and an annular dielectric spacer operatively disposed in said second housing counter bore intermediate said electrode and insulator means and said plug means.

6. A liquid propellant igniter as recited in claim 5 wherein said propellant bore means includes:

a restrictive throat bore in axial alignment with said ring electrode means; and a vertical propellant bore in axial alignment with said restrictive throat bore.

7. A liquid propellant igniter as recited in claim 6 wherein said electrode assembly means includes:

a high-voltage tapered electrode having a bottom end and a threaded top end;

a wave spring contactor operatively disposed intermediate said second electrode and tapered electrode bottom end;

an annular high strength insulator disposed around said tapered electrode bottom end;

a flanged hollow high strength feed through insulator having an inside diameter which slidably fits over and operatively supports said tapered electrode therein so that said high-voltage electrode is insulated from said housing means;

an externally threaded steel tubular member operatively holds said high voltage electrode against said wave spring contactor;

a top end electrode insulator is positioned in a top end of said tubular member, said top and electrode insulator supports the top end of said high-voltage electrode; and a cap nut connector terminal threadably connected to said threaded top end of high voltage electrode holds said wave-shaped spring in contact with said second-ring electrode.

* * * * *